US012559953B2

(12) United States Patent
Hellenschmidt

(10) Patent No.: US 12,559,953 B2
(45) Date of Patent: Feb. 24, 2026

(54) SCAFFOLD STAIRWAY HAVING STEP HOLDERS

(71) Applicant: PERI SE, Weissenhorn (DE)

(72) Inventor: Julian Hellenschmidt, Ulm (DE)

(73) Assignee: PERI SE, Weissenhorn (DE)

(*) Notice: Subject to any disclaimer, the term of this patent is extended or adjusted under 35 U.S.C. 154(b) by 960 days.

(21) Appl. No.: 16/980,793

(22) PCT Filed: Mar. 7, 2019

(86) PCT No.: PCT/EP2019/055728
§ 371 (c)(1),
(2) Date: Sep. 14, 2020

(87) PCT Pub. No.: WO2019/175020
PCT Pub. Date: Sep. 19, 2019

(65) Prior Publication Data

US 2020/0407984 A1 Dec. 31, 2020

(30) Foreign Application Priority Data

Mar. 12, 2018 (DE) ........................ 102018203682.9

(51) Int. Cl.
*E04G 5/10* (2006.01)
*E06C 1/39* (2006.01)
*E06C 7/08* (2006.01)
*E06C 7/16* (2006.01)

(52) U.S. Cl.
CPC .................. *E04G 5/10* (2013.01); *E06C 1/39* (2013.01); *E06C 7/08* (2013.01); *E06C 7/082* (2013.01); *E06C 7/084* (2013.01); *E06C 7/16* (2013.01)

(58) Field of Classification Search
CPC ..... E04G 5/10; E04G 7/02; E06C 1/39; E06C 7/08; E06C 5/30
See application file for complete search history.

(56) References Cited

U.S. PATENT DOCUMENTS 901,755 A * 10/1908 Tiepolt ...................... E06C 7/08 403/167
1,731,300 A * 10/1929 Ehlers ..................... E06C 7/081 182/228.1
1,960,863 A * 5/1934 Boyer ....................... E06C 7/16 182/228.1

(Continued)

FOREIGN PATENT DOCUMENTS

BE 857632 2/1978
CN 111734112 A 10/2020

(Continued)

OTHER PUBLICATIONS

FR 2847010 Translation.*

*Primary Examiner* — Brian D Mattei
*Assistant Examiner* — Kathleen M. McFarland
(74) *Attorney, Agent, or Firm* — SLEMAN & LUND LLP

(57) ABSTRACT

A scaffold stairway having two spaced-apart side rails designed as hollow profiles and a plurality of separate steps. The steps can be fastened by their free ends in holding devices for holding the steps that are designed as grooves on the mutually facing lateral faces of the side rails. The free ends of the steps lie on a groove flank or a groove flank portion. As a result, the side rails can be coupled.

18 Claims, 19 Drawing Sheets

(56) References Cited

U.S. PATENT DOCUMENTS

| | | | | | |
|---|---|---|---|---|---|
| 2,390,000 | A * | 11/1945 | Sampson | E06C 7/08 182/178.4 |
| 3,029,897 | A * | 4/1962 | Moberg | E06C 9/12 182/39 |
| 3,571,909 | A * | 3/1971 | Stern | E06C 7/084 29/524.1 |
| 3,854,185 | A * | 12/1974 | Reid | F16B 17/00 29/897 |
| 4,160,493 | A * | 7/1979 | Brice | E06C 7/16 248/235 |
| 4,231,448 | A * | 11/1980 | Jensen | E06C 7/084 182/151 |
| 5,244,291 | A * | 9/1993 | Confer | E06C 9/02 403/374.2 |
| 7,500,334 | B2 * | 3/2009 | Stevens | E04G 1/22 52/117 |
| 8,104,576 | B2 * | 1/2012 | Schwoerer | E04G 5/10 182/120 |
| 9,022,172 | B2 * | 5/2015 | McCarthy | E06C 1/345 182/129 |
| 10,358,871 | B2 * | 7/2019 | Honeycutt | E04G 1/17 |
| 11,613,898 | B2 * | 3/2023 | Garcia | E04G 1/362 182/222 |
| 2009/0205906 | A1 * | 8/2009 | Schwoerer | E04F 11/112 182/92 |
| 2011/0079465 | A1 * | 4/2011 | Karanouh | E04G 27/00 182/115 |
| 2011/0088973 | A1 * | 4/2011 | Shih | E04G 5/10 182/115 |
| 2012/0073902 | A1 * | 3/2012 | Honeycutt | E04G 7/02 182/113 |
| 2014/0209411 | A1 * | 7/2014 | McCarthy | E06C 7/16 182/129 |
| 2016/0265277 | A1 * | 9/2016 | Masters | E06C 7/085 |
| 2018/0179818 | A1 * | 6/2018 | Banerjee | E06C 7/084 |
| 2020/0340258 | A1 * | 10/2020 | Garcia | E04G 1/152 |

FOREIGN PATENT DOCUMENTS

| | | | | |
|---|---|---|---|---|
| DE | 1409302 | A1 * | 10/1958 | |
| DE | 7305502 | | 3/1974 | |
| DE | 2852082 | A1 * | 12/1978 | |
| DE | 3702256 | A1 * | 1/1987 | |
| EP | 0276488 | B1 * | 12/1987 | |
| EP | 0276488 | | 8/1988 | |
| EP | 1893827 | | 3/2008 | |
| FR | 2847010 | * | 5/2004 | |
| FR | 2847010 | A1 * | 5/2004 | E06C 7/087 |
| FR | 2944820 | A1 * | 10/2010 | B29C 70/48 |
| GB | 2255584 | | 11/1992 | |
| GB | 2255584 | A * | 11/1992 | E04G 1/28 |
| RU | 141326 | U1 * | 5/2014 | |
| WO | 2006136251 | | 12/2006 | |
| WO | WO-2006136251 | A1 * | 12/2006 | E04F 11/0255 |

* cited by examiner

SCAFFOLD STAIRWAY HAVING STEP HOLDERS

FIELD OF THE INVENTION

The invention relates to a scaffold stairway made of metal, plastics material or carbon-fiber composite material comprising step holders.

BACKGROUND OF THE INVENTION

EP 1 893 827 B1 discloses a scaffold stairway in which the stairway step elements can be detachably coupled to the side rails by being inserted one below the other and by means of holding devices. For this purpose, hooks which can engage in openings in the stairway steps are arranged on the side rails as holding devices.

Furthermore, EP 0 276 488 B1 discloses a scaffold stairway of which the components can be produced in a extrusion process from light metal, for example aluminum. The stairway steps are welded to the side rails of the scaffold stairway in a predetermined arrangement. Hooks of various types which are arranged on the stairway as additional components, for example have to be welded thereto, result in more time being required for producing the known scaffold stairway.

SUMMARY OF THE INVENTION

Therefore, the problem addressed by the invention is to provide a scaffold stairway comprising holding devices which can be produced in a stable form in as little time as possible. Another problem addressed by the invention is to provide a stairway arrangement which takes as little time to produce as possible. Yet another problem addressed by the invention is to provide a side rail of a scaffold stairway according to the invention.

The problem is solved by a scaffold stairway, features of the stairway arrangement, and features of the side rail According to the invention, the scaffold stairway comprises two separate side rails and a plurality of separate stairway step elements. The stairway step elements can be coupled to the side rails. Here, holding devices for holding the stairway step elements are formed on both side rails. The scaffold stairway is characterized in that the holding devices are provided as grooves or groove portions on side faces of the side rails that face one another, which side rails are designed as hollow profiles. The stairway step elements can be inserted into these grooves by their free ends. The free ends of the stairway step elements rest on a groove wall or groove-wall portion. Using the grooves in the side rails into which the stairway steps are inserted, the scaffold stairway can be produced by plug-in connections. Welding is not necessary to attach the stairway steps to the side rails. The vertical forces that occur at the connections between the stairway step elements or stairway steps and the side rails when using the stairway are absorbed by the side rails and dissipated into the side rails. The stairway step elements do not rest on additionally attached components, such as hooks, which protrude beyond the side rails in an exposed manner. Welded joints can be dispensed with. The forces or loads acting on the stairway step elements are introduced into the side rails without additional components. As a result, high stability of the connection between stairway step elements and side rails is ensured even when the stairway is used for a longer period of time. Optionally, additional components such as screws, hooks, rivets, bolts or adhesive can be used for securing the stairway step elements in place. Despite having a hollow profile in the form of the groove walls or groove-wall portions, the side rails comprise a contact surface for the stairway step elements which has sufficient strength. Here, the scaffold stairway at least comprises metal or consists of metal, for example the side rails and the stairway step elements. The side faces of the side rails that face one another form inner faces of the side rails, and the side faces of the side rails that face away from one another form outer faces of the side rails. The scaffold stairway may be made of metal, a metal alloy, steel, plastics material and/or a carbon-fiber composite material.

The grooves are oriented in parallel such that all the stairway steps can be inserted into the side rails with the same orientation.

Another embodiment of the scaffold stairway is characterized in that the same angle is formed between each groove and the longitudinal edges of the relevant side rail. In order to bring about a horizontal orientation of the stairway step elements, this angle may in particular correspond to a gradient angle of the side rails. The longitudinal edges may be closed or may be open at least in part.

The distances from the ends of the side rails at which the grooves are formed in the side rails may be correspondingly identical on both side rails. As a result, all the stairway steps can be connected to the side rails so as to be horizontally oriented in their width direction.

In an advantageous embodiment of the scaffold stairway, the side rails comprise a hollow profile and/or a foam filling in the interior of the side rails formed as hollow profiles. By means of a hollow profile, both the weight and the material consumption can be reduced compared with a solid material. Here, an increase in the stability of the side rails with a relatively low increase in weight can be achieved by a foam filling in the interior of the side rails.

The side rails may comprise first stops for the stairway step elements at the level of the grooves. The side rails can then be slid onto the stairway step elements and/or into the stairway step elements without the stairway step elements projecting beyond the side rails. The correct width of the stairway is specified by the stops and the lengths of the stairway step elements during mounting without any further alignment or adjustment. In this case, the height is in particular the vertical distance from the lower end of the relevant side rail to the upper end of the relevant side rail in the mounted state.

Another embodiment of the scaffold stairway is characterized in that the side rails comprise openings, in particular for rivets or bolts, at the level of the grooves on the side faces facing away from one another. The stairway step elements can then be fastened to the side rails by rivets. Alternatively or additionally, the stairway step elements can be fastened to the side rails by bolting, screwing, for example using a Torx profile, or by clinching or toxing.

A groove can be formed at the level of each of the grooves formed closest to the ends of the side rails in parallel with these grooves on the side faces of the side rails facing away from one another. The grooves formed closest to the ends of the side rails on the side faces facing one another and facing away from one another can be used for correctly positioning and fastening additional components of a stairway arrangement, in particular when sliding on platforms, at the lower and upper ends of the side rails.

At least one protruding rib is formed, in particular centrally, in the longitudinal direction of the relevant side rail which comprises the grooves or groove portions, on the side faces facing one another, in particular on the side faces facing one another and the side faces facing away from one another, of the side rails. The grooves may be formed in the rib in the form of cut-outs, for example by milling, with the side rails still always having sufficient stability and strength. The depths of the cut-outs or grooves in the side rails are limited and end at the level of the channels between the ribs of the hollow profile.

The side rails may comprise regularly or irregularly spaced ribs. In particular, a first rib may be formed on a first longitudinal edge and a second rib may be formed on a second longitudinal edge in this case. A plurality of ribs brings about increased rigidity of the side rails and more stable support of the stairway step elements. The grooves may be formed between the longitudinal edges over the entire width of the relevant side rail by recesses in the ribs, and as a result the free ends of the stairway step elements can be guided in the grooves in a more stable manner, in particular when inserting the stairway step elements. The groove walls may form a contact surface for the stairway step elements here.

In another embodiment of the scaffold stairway, a first, a second, a third and a fourth protruding rib are each arranged on the faces of the side rails that face one another. Of the ribs, in particular the first and fourth protruding ribs are arranged on the longitudinal edges of the side rails and the second and third protruding ribs are arranged between the first and fourth protruding ribs. Here, the second and third protruding ribs can be a greater distance from one another than both the first and second protruding ribs from one another and the third and fourth protruding ribs from one another. The distances between the first and second ribs and between the third and fourth ribs can in particular be the same.

Hollow chambers can be formed in at least one side rail. Improved rigidity of the side rails can be brought about by side walls of the hollow chambers.

The stairway steps may comprise hook-shaped tabs, in particular comprising openings into which bolts or rivets can be inserted. The tabs can then be fastened in a non-displaceable and stationary manner for the secure fixing to the side rails by bolts and/or rivets.

Advantageously, the side rails have a gradient angle of from 30° to 55°. A gradient angle of this kind makes it possible to safely and rapidly walk on the stairway in accordance with the DIN EN 12811 standard.

The scaffold stairway can be produced from light metal, in particular aluminum. A scaffold stairway of this kind has high stability with a relatively low weight.

A stairway arrangement comprises a scaffold stairway according to the invention and a platform that is arranged on the scaffold stairway, in particular in a detachably fixed manner. The stairway arrangement can in particular comprise a platform arranged at each end of the scaffold stairway. A platform provides an improved connection of the scaffold stairway to adjacent components, such as scaffold parts (scaffold posts, scaffold tubes, scaffold boards), for example such that it can be walked on easily without additional components.

An advantageous embodiment of the stairway arrangement is characterized in that the platform comprises two slots and/or two profile rails, in or between each of which a side rail of the scaffold stairway can be inserted. The slots and/or profile rails in particular each have a second stop for the side rails. By means of slots or rails of this kind, the platform can be arranged on the scaffold stairway in a simple manner.

The walls of each slot and/or profile rail can comprise two tongues that are opposite one another. Here, each tongue can be inserted into one of the grooves which are formed closest to the ends of the side rails on one side face in each case. By means of tongues of this kind, the side rails can be secured against being displaced in the vertical direction relative to the platform when the tongues are engaged in the corresponding grooves. When using tongues and grooves of this kind, all the force is transmitted from the scaffold stairway to the platform. A rigid connection between the scaffold stairway and the platforms is made possible, in particular without additional components.

The slots and/or profile rails may comprise openings, into which bolts or rivets can be inserted. By means of bolts and/or rivets of this kind, the platform can be fastened to the scaffold stairway in a simple manner. In addition, this makes it possible to secure against displacement, in particular in the horizontal direction, and makes additional vertical force absorption possible.

The length of the scaffold stairway in the horizontal direction can, inter alia, be set by the selection of different platforms that differ in their length. Likewise, the height of the scaffold stairway in the vertical direction can, inter alia, be configured to be different by the selection of different lengths of the side rails of the scaffold stairway and of different gradient angles of the side rails.

The scaffold stairway according to the invention can in particular be produced without welded joints. The stairway step elements are permanently connected to the side rails. The platforms can be removed without great effort in order to transport the scaffold stairway in a space-saving manner.

A side rail of a scaffold stairway made of metal, plastics material or carbon-fiber composite material comprises grooves which are formed on a side face and are formed as a receptacle for stairway step elements so as to be spaced apart from one another.

In a side rail of a scaffold stairway, the grooves can be open at at least one end.

BRIEF DESCRIPTION OF THE DRAWINGS

Further features and advantages of the invention will become apparent from the following detailed description of a plurality of embodiments of the invention, from the claims and with reference to the figures of the drawings, which show details essential to the invention. The features shown in the drawings are set out such that the special features according to the invention can be made clearly visible.

In the drawings.

DETAILED DESCRIPTION

Figure 1:
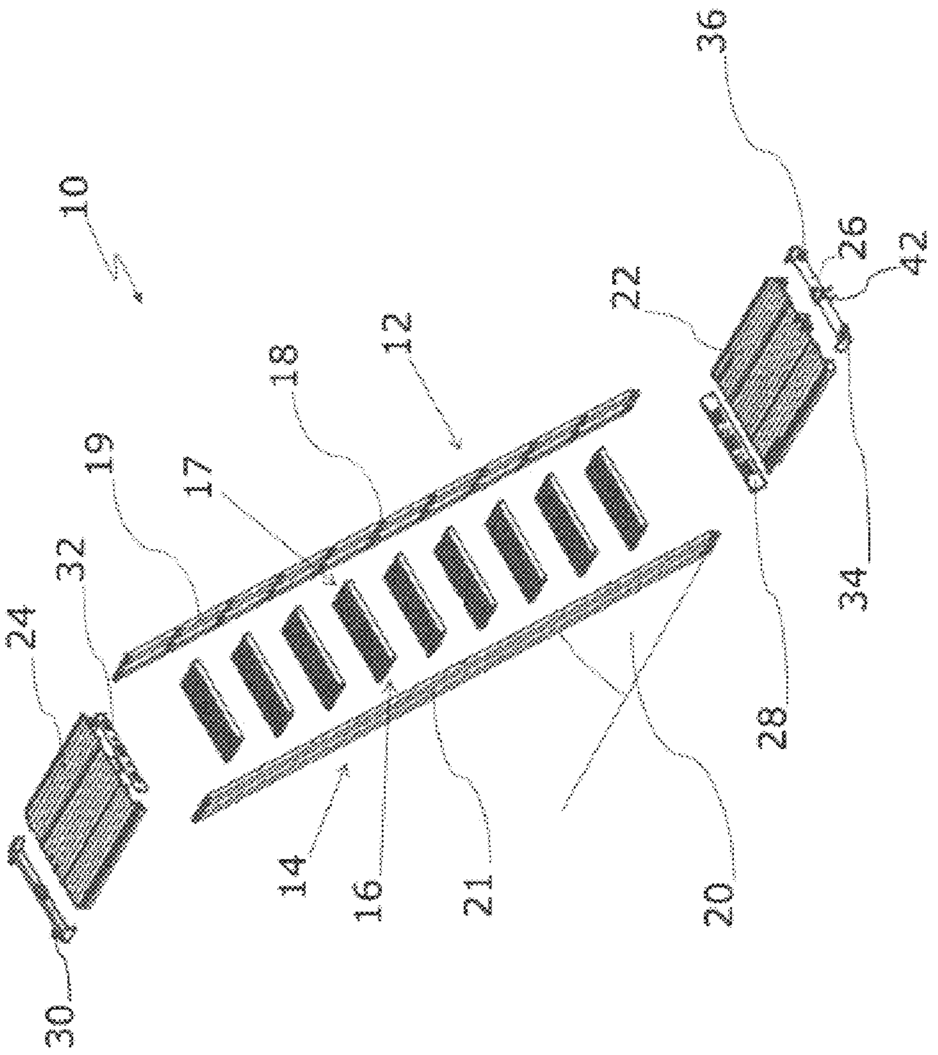
FIG. 1 is an exploded view of the scaffold stairway according to the invention.

FIG. 1 is an exploded view of a scaffold stairway 10 according to the invention. The scaffold stairway 10 comprises a first side rail 12 and a second side rail 14, which is arranged so as to be spaced from the first side rail 12 and extends in parallel therewith. The side rails 12, 14 are hollow metal profiles, preferably made of aluminum. The scaffold stairway 10 comprises stairway step elements, with a stairway step element being denoted by reference sign 16 here by way of example. The stairway step elements each comprise two free ends, one of which is denoted by reference sign 17 here by way of example. Cut-outs in the form of grooves are formed in the side rails 12, 14 as holding devices for holding the stairway step elements 16, one of which is denoted by reference sign 18 here by way of example. When the scaffold stairway 10 is mounted, the stairway step elements 16 are securely arranged in these grooves 18. The side rails 12, 14 comprise two side faces that face one another in the form of inner faces, one of which is denoted by reference sign 19 here by way of example. When mounted, the side rails 12, 14 have a gradient angle 20 relative to a horizontal ground surface. Furthermore, the side rails 12, 14 comprise two side faces that face away from one another in the form of outer faces, one of which is denoted by reference sign 21 here by way of example. A first platform 22 and a second platform 24 are arranged on the scaffold stairway 10. When the scaffold stairway 10 is mounted, the first platform 22 is arranged at the bottom of the scaffold stairway 10 and, when the scaffold stairway 10 is mounted, the second platform 24 is arranged at the top on the side rails 12, 14. On the first platform 22, a first fitting 26 is arranged on the outside and a first plate 28 is arranged on the inside, towards the side rails. On the second platform 24, a second fitting 30 is arranged on the outside and a second plate 32 is arranged on the inside. The fittings 26, 30 and the plates 28, 32 serve to reinforce and stabilize the platforms 22, 24. The outside first and second fittings 26, 30 also serve to anchor the platforms 22, 24 to other components. For this purpose, the two fittings 26, 30 each comprise a first hook 34 and a second hook 36 in the outer region thereof. These hooks 34, 36 may for example engage around a bar of a scaffold frame (see FIG. 10) at least in part. The two fittings 26, 30 also comprise an anti-lift device 42 for securing against displacement in the upward direction. All the components of the stairway are preferably made of aluminum or another light metal. The stairway step elements 16 and the platforms 22, 24 are contoured on their surfaces for increased safety when they are walked on. The fittings 26, 30 are in particular made of steel.

Figure 2:
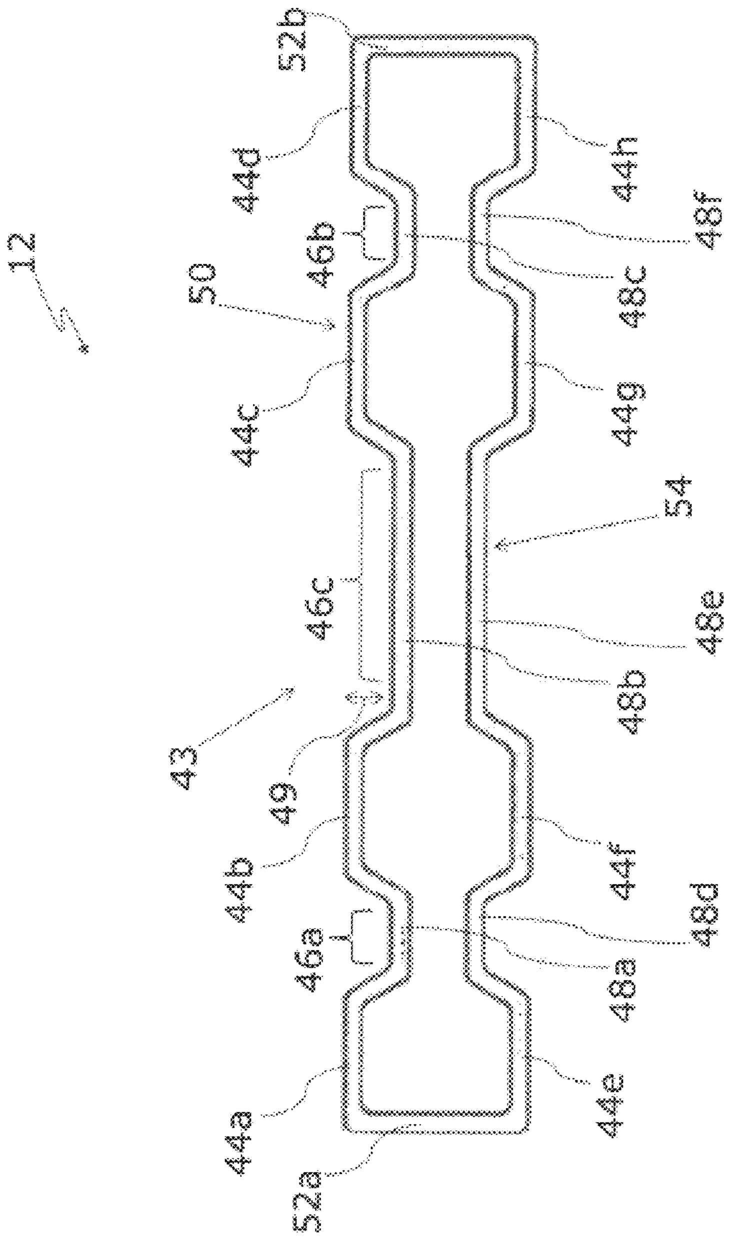
FIG. 2 is a cross section through a first embodiment of a side rail of the scaffold stairway according to the invention.

FIG. 2 is a cross section through a first embodiment of the side rails 12, 14, with the side rail 12 being shown here by way of example. The features of one side rail 12, 14 set out in the following apply to the other side rail 12, 14 in a corresponding manner. The side rail 12 is designed as a hollow profile 43. The side rail 12 comprises a first, a second, a third and a fourth rib **44*a*, 44*b*, 44*c*, 44*d* to reinforce and to form the grooves. The first rib 44*a* and the fourth rib 44*d* are each positioned on the edge of the side rail 12. The second rib 44*b* and the third rib 44*c* are located between the first rib 44*a* and the fourth rib 44*d*. The distances 46*a*, 46*b* between the first and second ribs 44*a*, 44*b* and the third and fourth ribs 44*c*, 44*d* are in particular the same. These distances 46*a*, 46*b* are smaller than the distance 46*c* between the second rib 44*b* and the third rib 44*c*. A first, a second and a third channel 48*a*, 48*b*, 48*c* in the form of depressions are formed between the ribs 44*a*-44*d* along these distances 46*a*, 46*b*, 46*c*. The ribs 44*a*-44*d* have a rib height 49. The rib height 49 is in particular defined by the maximum distance between the ribs 44*a*-44*d* and the channels 48*a*, 48*b*, 48*c* in the direction perpendicular to the surface of the ribs 44*a*-44*d*. The ribs 44*a*-44*d* are arranged on one side 50 of the side rail 12 on the longitudinal edges 52*a*, 52*b* and/or between the longitudinal edges 52*a*, 52*b* of the side rail 12 on which the stairway step elements 16 can be arranged, in particular on the inner face 19 of the side rail 12 (see FIG. 1). Ribs 44*e*, 44*f*, 44*g*, 44*h* and channels 48*d*, 48*e*, 48*f* can likewise be formed on the side 54 of the side rail 12 opposite the side 50, in particular the outer face 21 of the side rail 12 (see FIG. 1), in particular in the same way as on the side 50**.

FIG. **3*a* shows a free end 17 of a stairway step element 16 in a first embodiment showing a detail 58 of a side rail 12, 14, by way of example of the side rail 12 here, in which the free end 17 of the stairway step element 16 is fastened. In this fastening region, when mounted, the ribs 44*a*-44*d* formed on the inner face 19 of the side rail 12 comprise groove portions 59*a*, 59*b*, 59*c*, 59*d*, which are arranged beside one another in the horizontal direction, in the form of cut-outs comprising groove-wall portions in the form of the edges of the groove portions 59*a*-59*d*, two of which are denoted by reference signs 60*a*, 60*b* here by way of example. The groove portions 59*a*-59*d* extend over the entire width of the relevant rib 44*a*-44*d* in a direction perpendicular to the longitudinal edges 52*a*, 52*b* of the side rails 12 along the side rail 12. The groove portions 59*a*-59*d* extend over the entire rib height 49 (see FIG. 2) of the ribs 44*a*-44*d*, perpendicularly to the side rails 12 in the direction of the stairway step elements 16, measured from the channels 48*a*-48*c* (see FIG. 2) in the side rail 12 between the ribs 44*a*-44*d*. This rib height 49 determines the depth of the groove 18. The relevant rib 44*a*-44*d* is completely interrupted in the region of the groove portions 59*a*-59*d*. In the region of the groove portions 59*a*-59*d*, the side rail 12 does not comprise a raised portion, but comprises groove-shaped openings over the extension thereof. The groove portions 59*a*-59*d* form the groove 18. The edges of the groove portions 59*a*-59*d* form a first stop 61 for the free end 17 of the stairway step element 16. In order to prevent the stairway step elements 16** from falling out, the stairway step elements 16 can be connected to the relevant side rail 12, 14 by bonding or welding, for example.

Figure 3A:
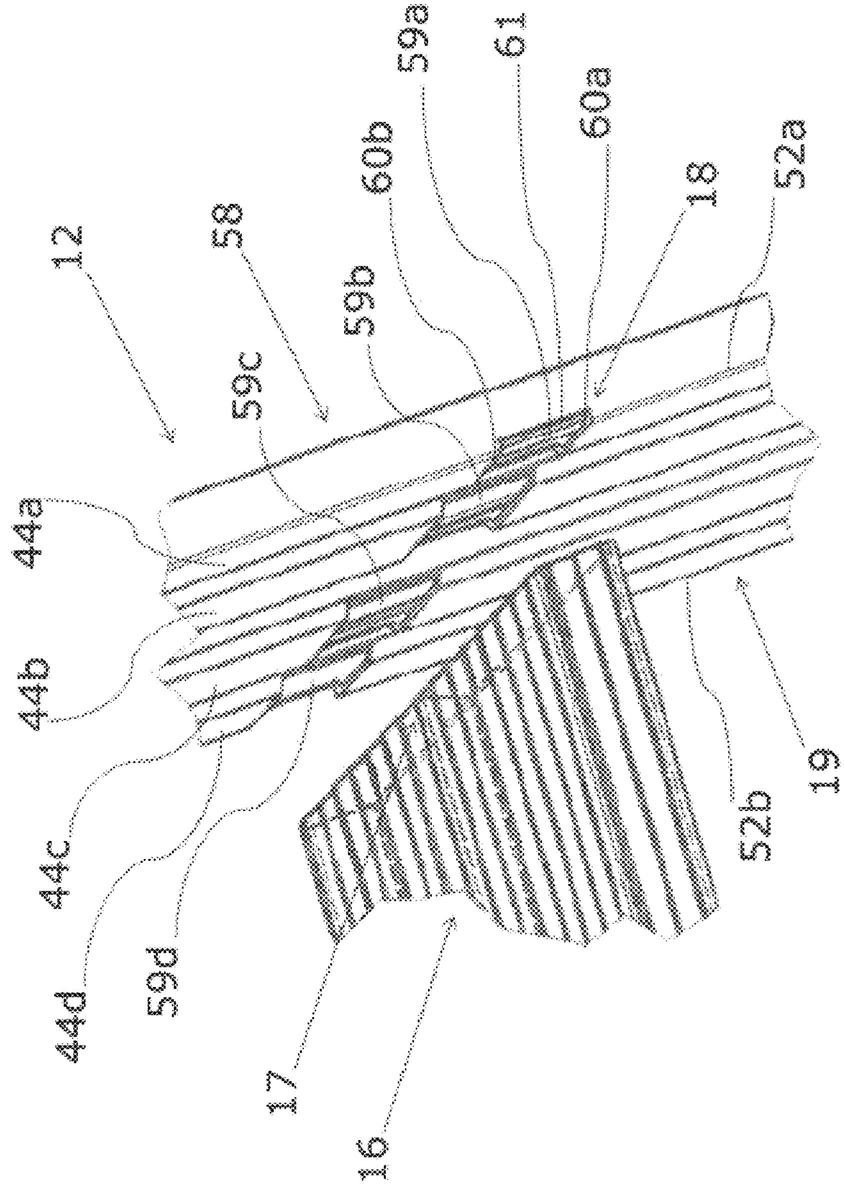
FIG. 3*a* is an isometric view of a free end of a stairway step element in a first embodiment showing a detail of a side rail.
Figure 3B:
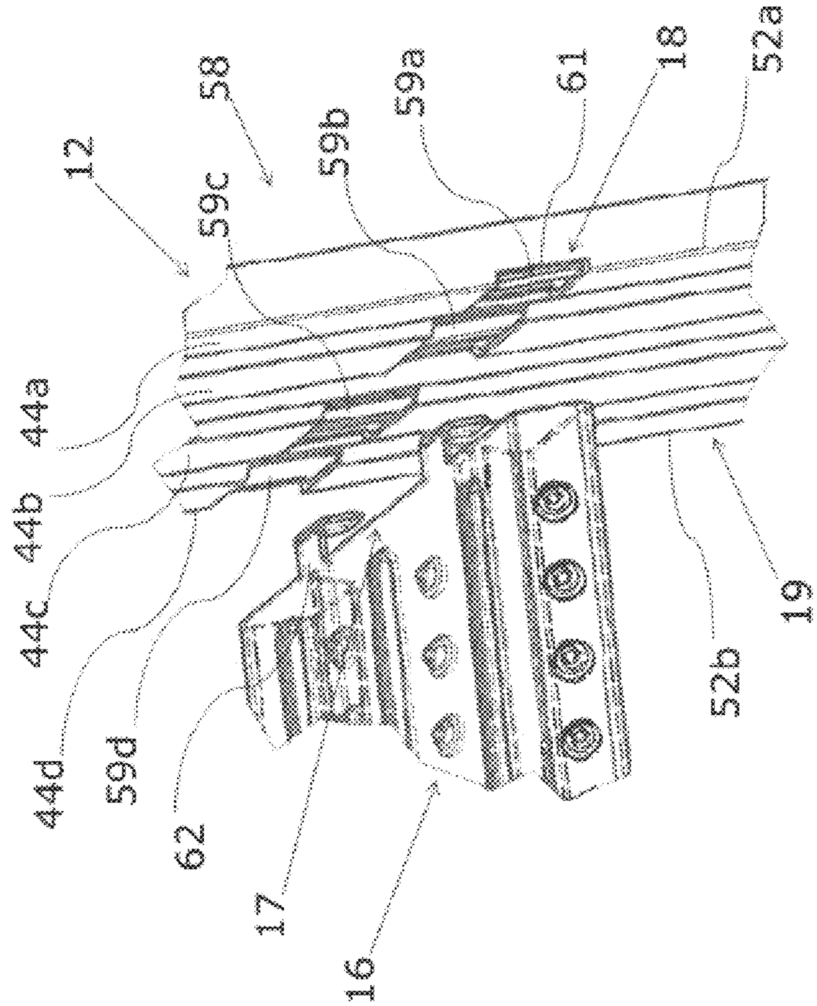
FIG. 3*b* is an isometric view of a free end of a stairway step element in a second embodiment showing a detail of a side rail.

FIG. 3b shows a free end 17 of a stairway step element 16 in a second embodiment showing the detail 58 of the side rail 12. As in FIG. 3a, the ribs 44a-44d are shown on the inner face 19 of the side rail 12 comprising the groove portions 59a-59d, which extend perpendicularly to the longitudinal edges 52a, 52b of the side rails 12 along the side rail 12. The groove portions 59a-59d together form the groove 18. The edges of the groove portions 59a-59d form the first stop 61 for the free end 17 of the stairway step element 16 in the second embodiment. In the second embodiment, the free end 17 of the stairway step element 16 comprises tabs, one of which is denoted by reference sign 62 here by way of example. The tabs 62 can be guided through the groove portions 59a-59d of the side rail 12 and can be fastened to the outside of the side rail 12 (see FIG. 4), for example by riveting, clinching, toxing, bolting, screwing or bonding. The stairway step elements 16 comprise dome-shaped raised portions, which are designed for increased safety when they are walked on.

Figure 4:
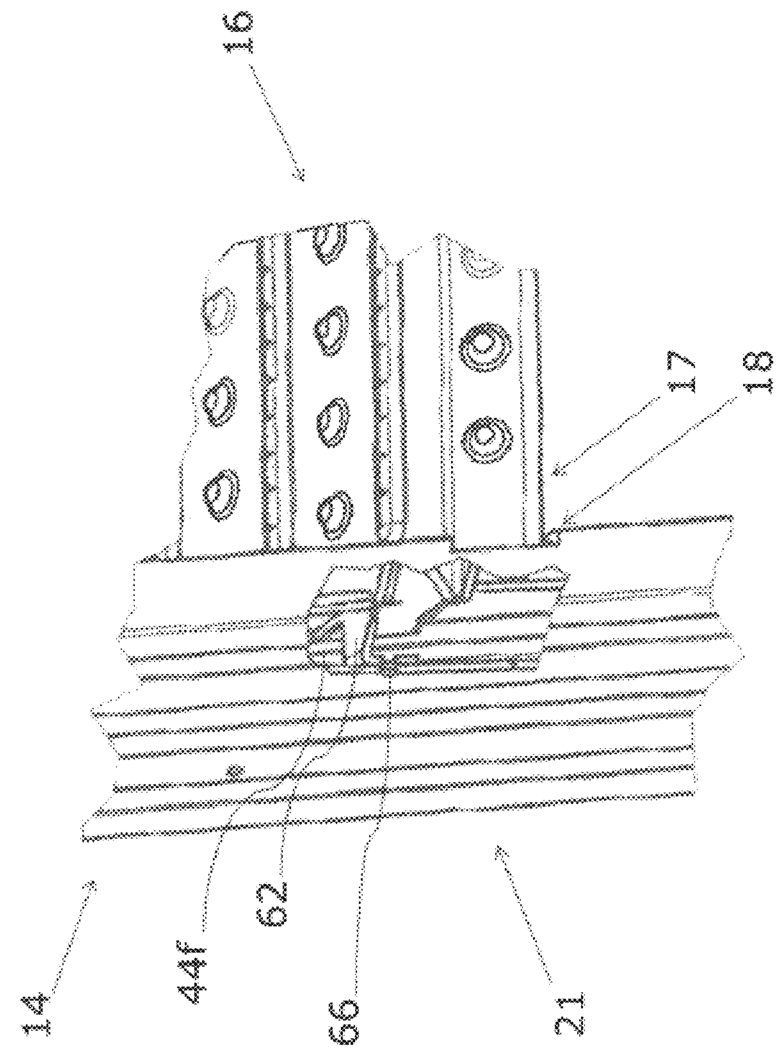
FIG. 4 is an isometric view of a stairway step element fastened in a side rail.

FIG. 4 shows the second embodiment of a stairway step element 16 fastened in a side rail 12, 14, here the side rail 14 by way of example. The free end 17 of the stairway step element 16 is inserted into the groove 18, and it rests on the lower edge of the groove 18. In particular, a tab 62 on the free end 17 of the stairway step element 16 is shown, which is fastened to the outer face 21 of the side rail 14 in one of the channels 48d, 48e, 48f (see FIG. 2). The tab 62 rests on the inside on a rib 44e-44h, here the rib 44f by way of example, of the outer face 21 of the side rail 14. Openings are made on the outer face 21 of the side rail 14 and in the tab 62, one of which is denoted by reference sign 66 here by way of example and through which rivets (not shown) can be guided for fastening the stairway step element 16 to the side rails 12, 14.

Figure 5:
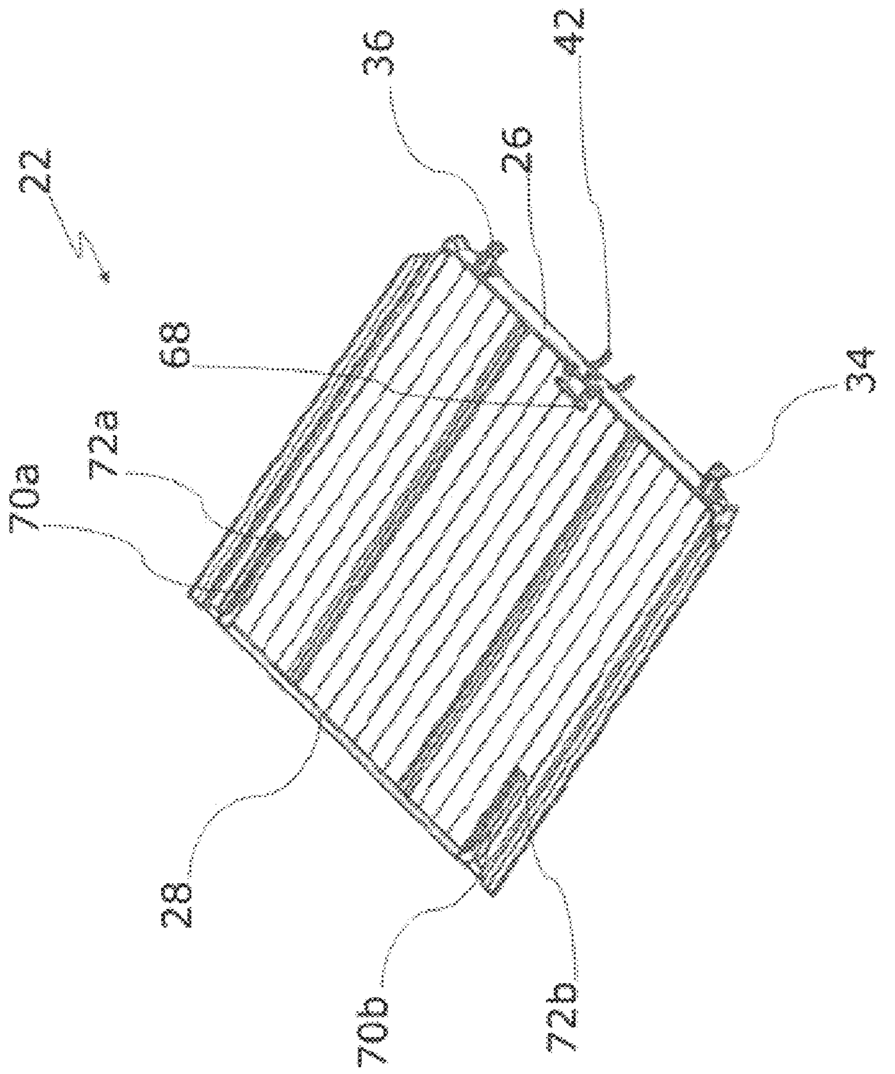
FIG. 5 is an isometric view of a first platform of the scaffold stairway from above.

FIG. 5 is a view from above of the first platform 22 comprising the first plate 28 and the first fitting 26. The first hook 34 and the second hook 36 are arranged on the first fitting 26 in the outer region thereof for hooking into a scaffold frame or bar. These hooks 34, 36 may for example engage around a bar of a scaffold frame (see FIG. 10) at least in part. The anti-lift device 42 for securing the scaffold stairway 10 (see FIG. 1) against displacement in the upward direction is centrally arranged on the first fitting 26 when mounted. The first platform 22 comprises a handle 68 for transporting the first platform 22.

The first platform 22 comprises slots 70a, 70b having such a width that one side rail 12, 14 (see FIG. 1) can be inserted into each slot 70a, 70b for arranging the side rails 12, 14 on the first platform. A second stop 72a, 72b is arranged on each of the slots 70a, 70b, which stop can limit the insertion distance of the side rails 12, 14 into the first platform 22 to the length of the relevant slot 70a, 70b.

The first platform 22 is designed as a lower platform and can be removed from the side rails 12, 14 as required in order to transport the scaffold stairway 10 in a space-saving manner.

Figure 6:
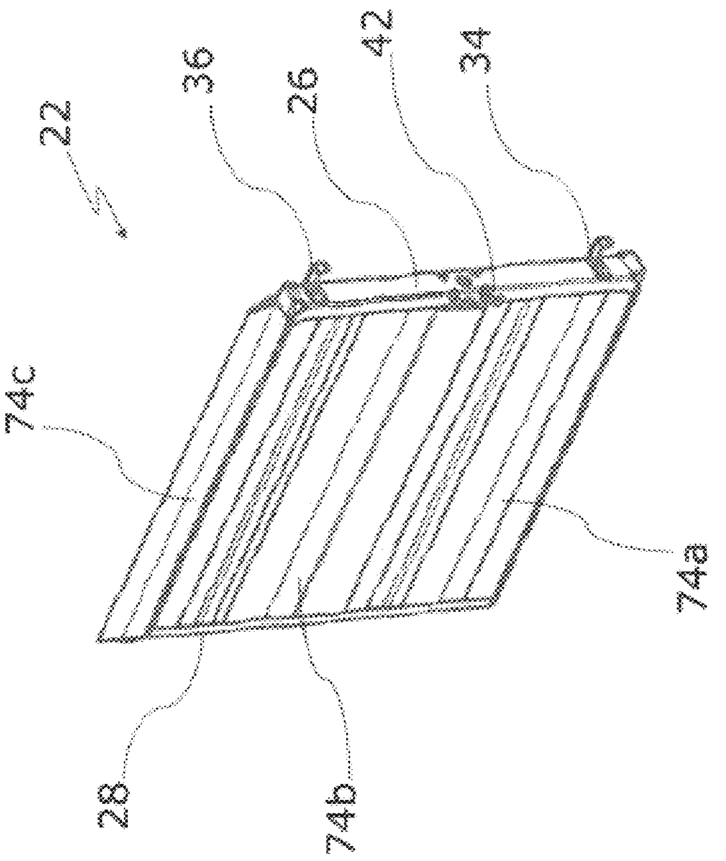
FIG. 6 is an isometric view of the first platform of the scaffold stairway from below.

FIG. 6 is a view from below of the first platform 22 comprising the first plate 28 and the first fitting 26 as well as the first hook 34, the second hook 36 and the anti-lift device 42. When mounted, the first platform 22 comprises profile rails 74a, 74b, 74c on the underside.

Figure 7:
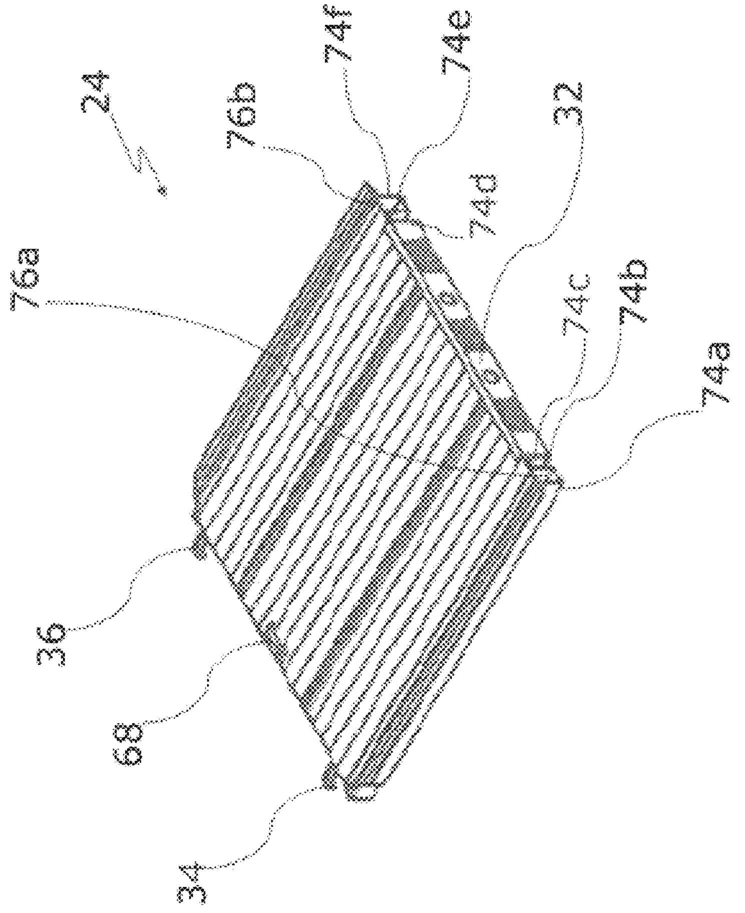
FIG. 7 is an isometric view of a second platform of the scaffold stairway from above.

FIG. 7 is a view from above of the second platform 24 comprising the second plate 32. The first hook 34 and the second hook 36 are arranged on the second fitting 30 (see FIG. 1) for hooking into a horizontally extending scaffold bar (see FIG. 10). The second platform 24 likewise comprises a handle 68 for transporting the second platform 24. When mounted, the second platform 24 comprises profile rails 74a, 74b, 74c, 74d, 74e, 74f on the underside thereof, with pairs of profile rails 74a-74f having such spacing that a side rail 12, 14 (see FIG. 1) can be inserted between two profile rails 74a-74f in each case. Part of the profile rails 74a-74f defines hollow chambers formed on the underside of the second platform 24 in order to reinforce the platform 24, two of which are denoted by reference signs 76a, 76b here by way of example.

Figure 8:
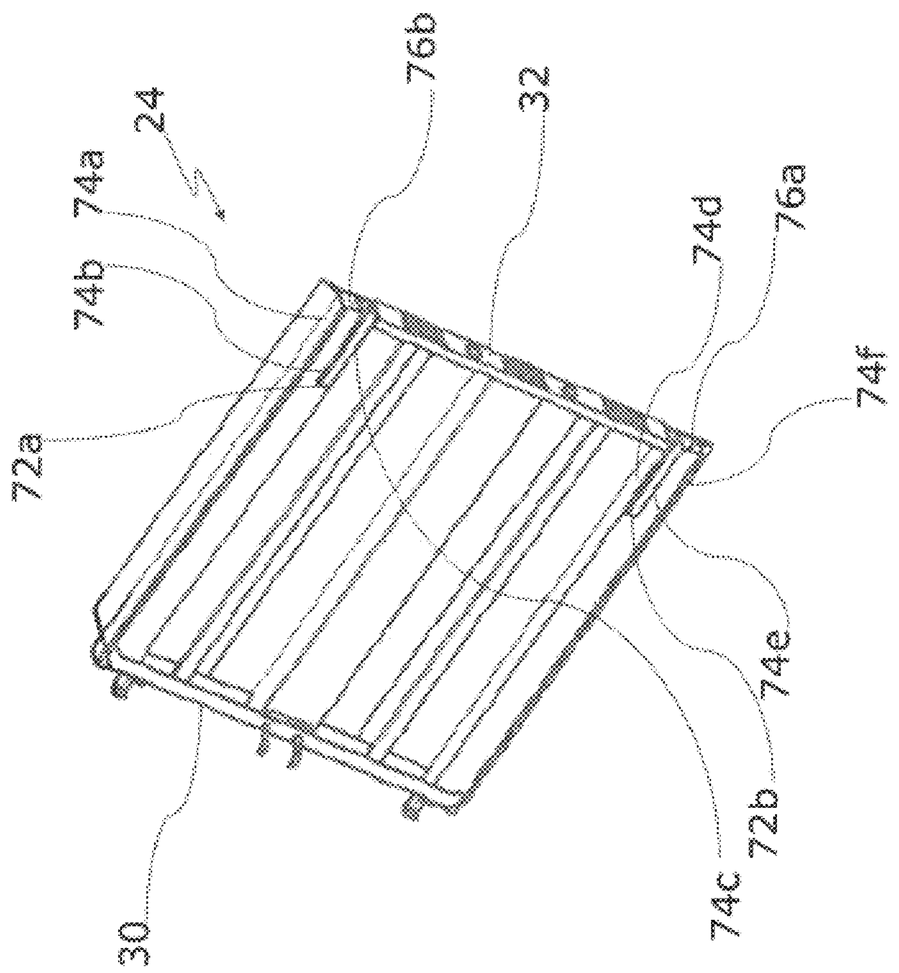
FIG. 8 is an isometric view of the second platform of the scaffold stairway from below.

FIG. 8 is a view from below of the second platform 24 comprising the second plate 32 and the second fitting 30 and the profile rails 74a-74f as well as the hollow chambers 76a, 76b. Second stops 72a, 72b for the side rails 12, 14 (see FIG. 1) are arranged between the profile rails 74b-74e.

Figure 9:
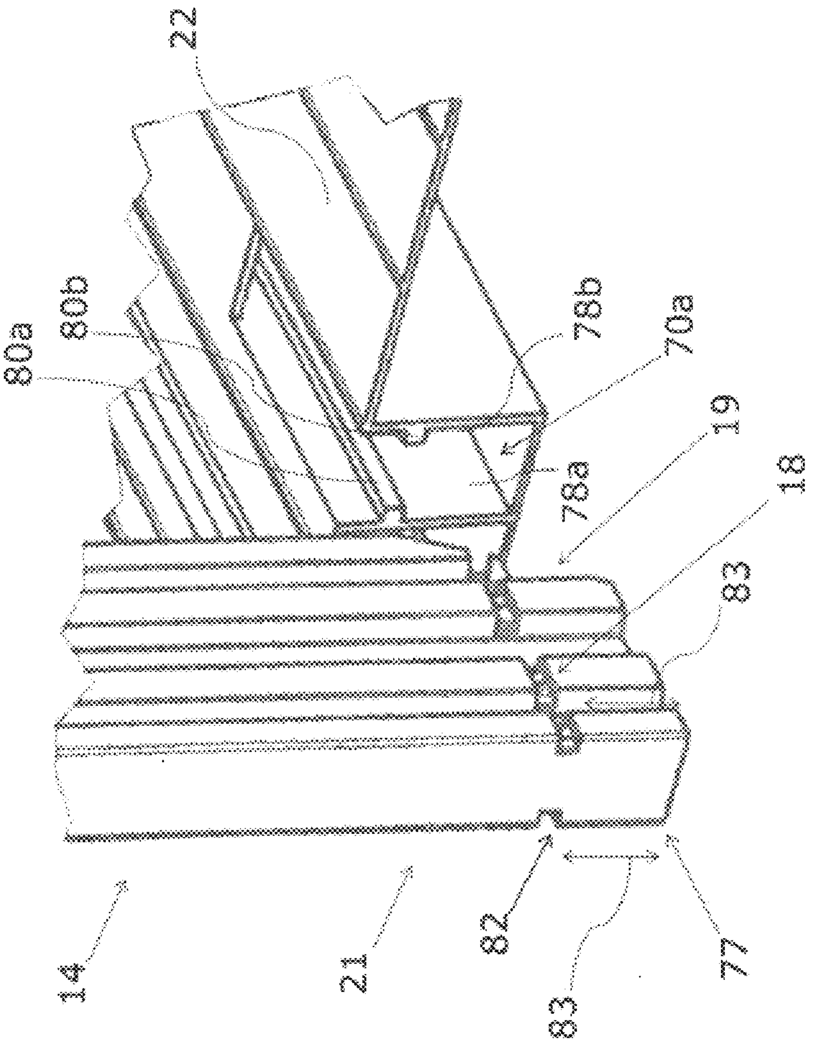
FIG. 9 is an isometric view of a lower end of a side rail and a corresponding slot in the first platform.

FIG. 9 shows the lower end 77 of a side rail 12, 14 when mounted, by way of example the side rail 14 here, and a corresponding slot 70a, 70b, here the slot 70a, in the first platform 22. Tongues 80a, 80b are formed on the walls 78a, 78b of the slot 70a. A groove 82 is likewise formed on the outer face 21 of the side rail 14 opposite the groove 18 on the inner face 19 of the side rail 14 which is formed closest to the lower end 77 of the side rail 14. The groove 82 on the outer face 21 of the side rail 14 extends in parallel with the groove 18 on the inner face and is designed to have the same spacing 83 from the lower end 77 of the relevant side rail as the groove 18 closest to the lower end 77 of the side rail 14 on the inner face 19 of the side rail 14. The tongues 80a, 80b can be inserted into the grooves 18, 82 on the inner face and the outer face 19, 21 of the side rail 14 which are closest to the lower ends 77 of the side rail 14. As a result, the side rail 14 is secured against vertical displacement relative to the first platform 22.

Corresponding tongues 80a, 80b can be formed on the walls 78a, 78b of the profile rails 74a, 74b of the second platform 24, with which grooves 18, 82 on the inner face and outer face 19, 21 of the respective side rails 12, 14 can engage at the corresponding end 77 of the side rail 12, 14. The side rails 12, 14 can then be fastened to the second platform 24 such that they cannot be displaced in the vertical direction. By means of this connection between the platforms 22, 24 and the side rails 12, 14, it is ensured that all the force is transmitted via the platforms 22, 24 to scaffolding (see FIG. 10). An additional connection by means of screwing, riveting, bonding or bolting can support this connection and secures the side rails 12, 14 against slipping out.

Figure 10:
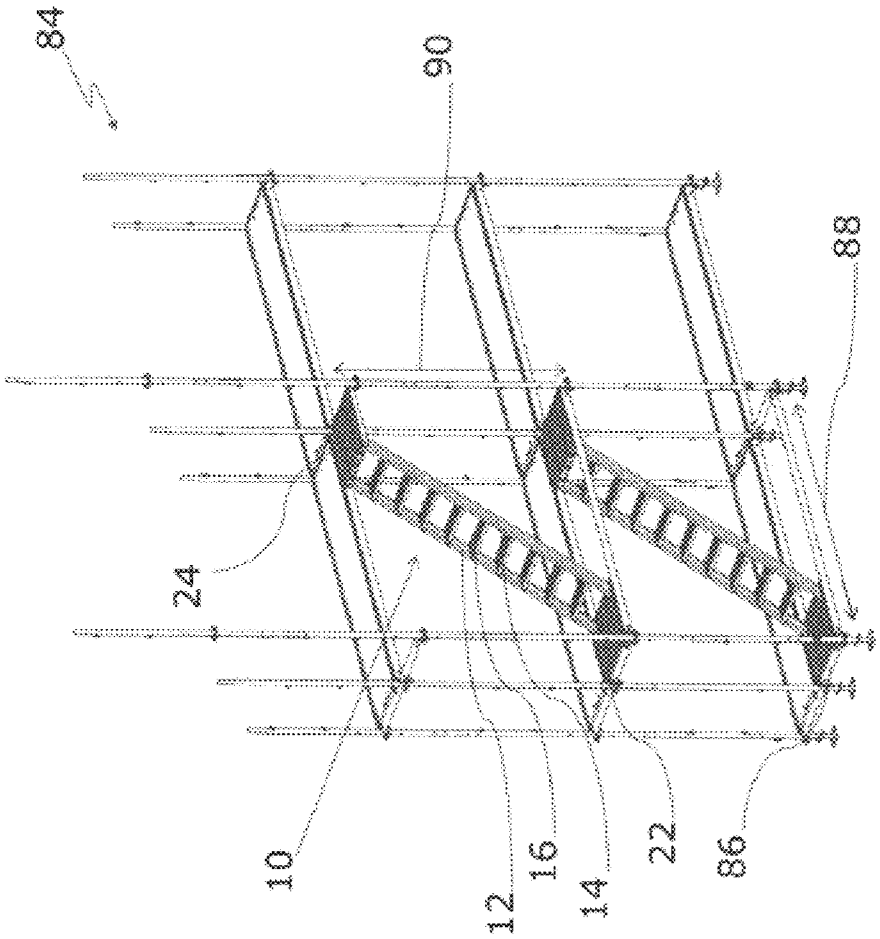
FIG. 10 is an isometric view of scaffolding comprising the scaffold stairway according to the invention.

FIG. 10 is an isometric view of scaffolding 84 comprising scaffold stairways 10 according to the invention when mounted. The stairway step elements 16 are fastened to the side rails 12, 14, by means of which the side rails 12, 14 are coupled to one another. The first and/or second platforms 22, 24 are hooked to bars 86 of the scaffolding 84 for fastening the scaffold stairway 10. The extension 88 of the scaffold stairway 10 in the horizontal direction can, inter alia, be differently set by the selection of different first and/or second platforms 22, 24. Likewise, the height 90 of the scaffold stairway 10 in the vertical direction can, inter alia, can be configured to be different by the selection of different lengths of the scaffold stairway 10 and of different gradient angles 20 (see FIG. 1).

Figure 11:
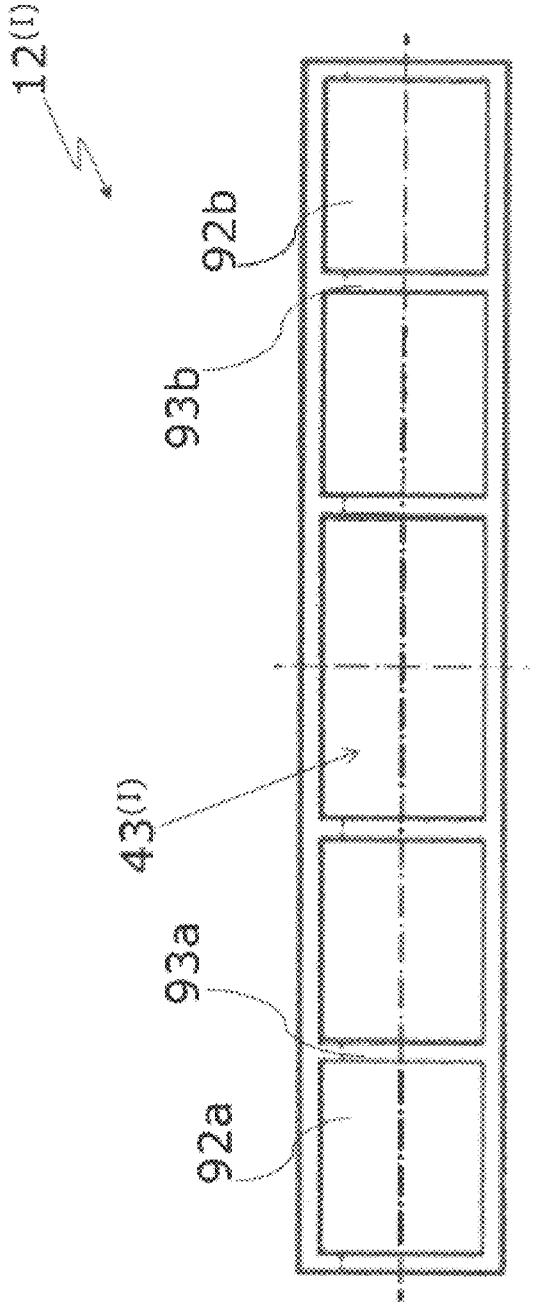
FIG. 11 is a cross section through a second embodiment of a side rail of the scaffold stairway.

FIG. 11 is a cross section through a second configuration of side rails, by way of example a side rail $12^{(I)}$ here. The side rail $12^{(I)}$ is designed as a hollow profile $43^{(I)}$. To reinforce and form the grooves 18 (see FIG. 1), the side rail $12^{(I)}$ comprises hollow chambers comprising side walls, with two hollow chambers being denoted by reference signs 92*a*, 92*b* and comprising side walls 93*a*, 93*b*.

Figure 12:
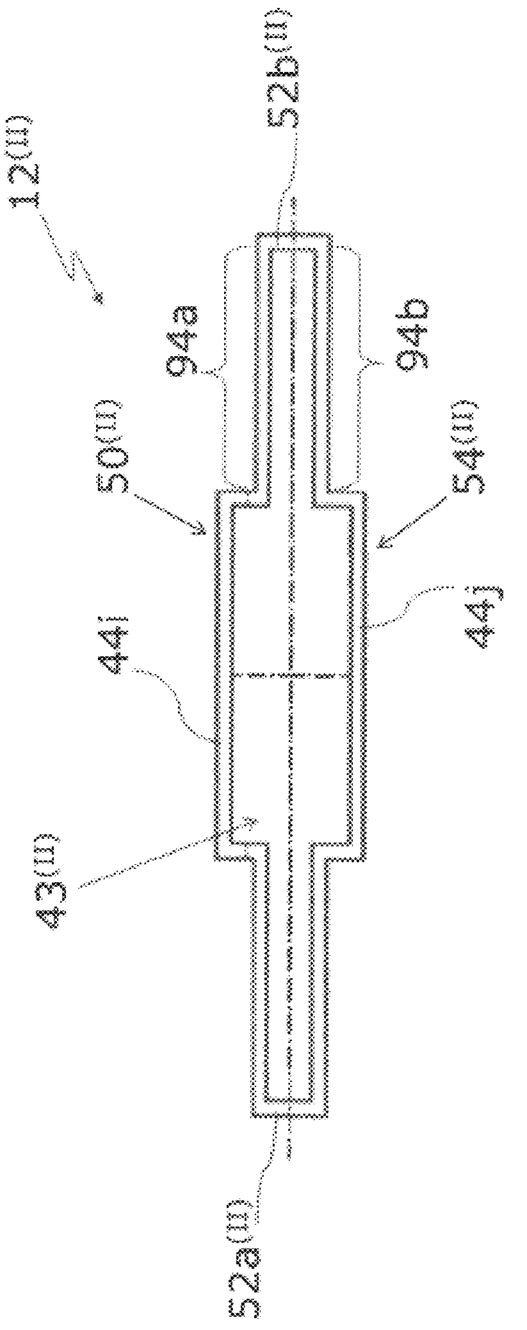
FIG. 12 is a cross section through a third embodiment of a side rail of the scaffold stairway.

FIG. 12 is a cross section through a third configuration of side rails, by way of example the side rail 12$^{(II)}$ here. The side rail 12$^{(II)}$ is designed as a hollow profile 43$^{(II)}$. To reinforce and form the grooves, the side rail 12$^{(II)}$ comprises a rectangular fifth and a sixth rib 44*i*, 44*j* on the opposite sides 50$^{(II)}$, 54$^{(II)}$ of the side rail 12$^{(II)}$ The fifth and sixth rib 44*i*, 44*j* are each symmetrical to the center of the relevant side 50$^{(II)}$, 54$^{(II)}$. They have the same spacing 94*a*, 94*b* from the longitudinal edges 52*a*$^{(II)}$, 52*b*$^{(II)}$.

Figure 13:
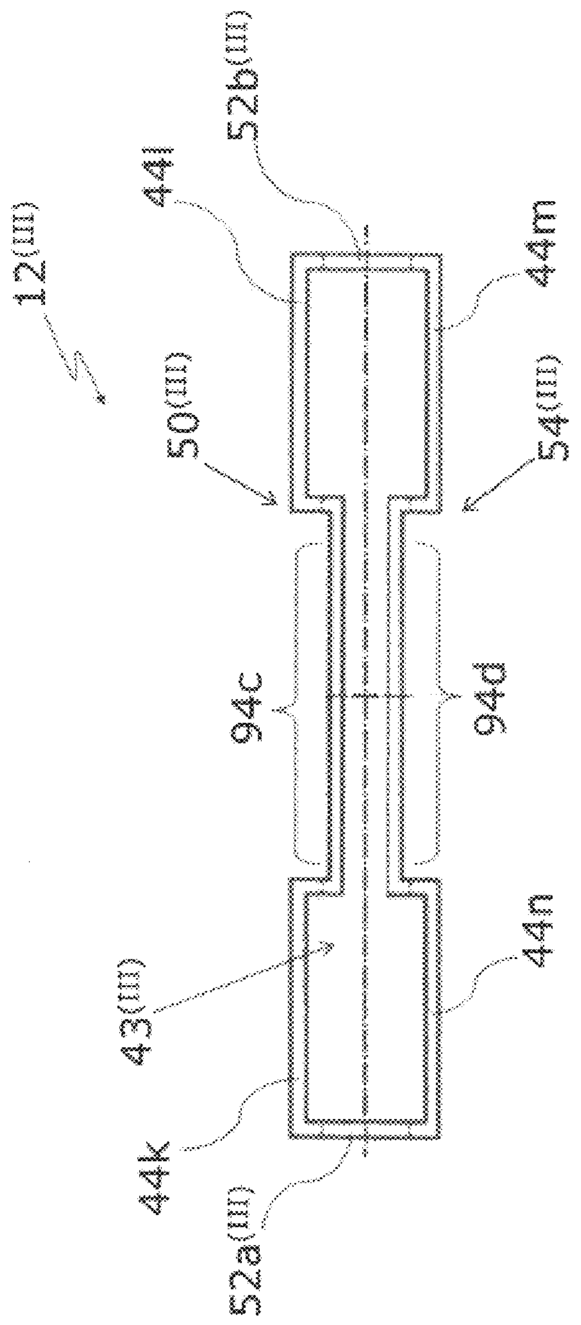
FIG. 13 is a cross section through a fourth embodiment of a side rail of the scaffold stairway.

FIG. 13 is a cross section through a fourth configuration of the rectangular side rails designed as hollow profiles 43$^{(III)}$, by way of example the side rail 12$^{(III)}$ here. On opposite sides 50$^{(III)}$, 54$^{(III)}$, ribs 44*k*, 44*l*, 44*m*, 44*n* having an identical rectangular shape are formed on longitudinal edges 52*a*$^{(III)}$, 52*b*$^{(III)}$ and have the same spacing 94*c*, 94*d* from one another in pairs on either side 50$^{(III)}$, 54$^{(III)}$.

Figure 14:
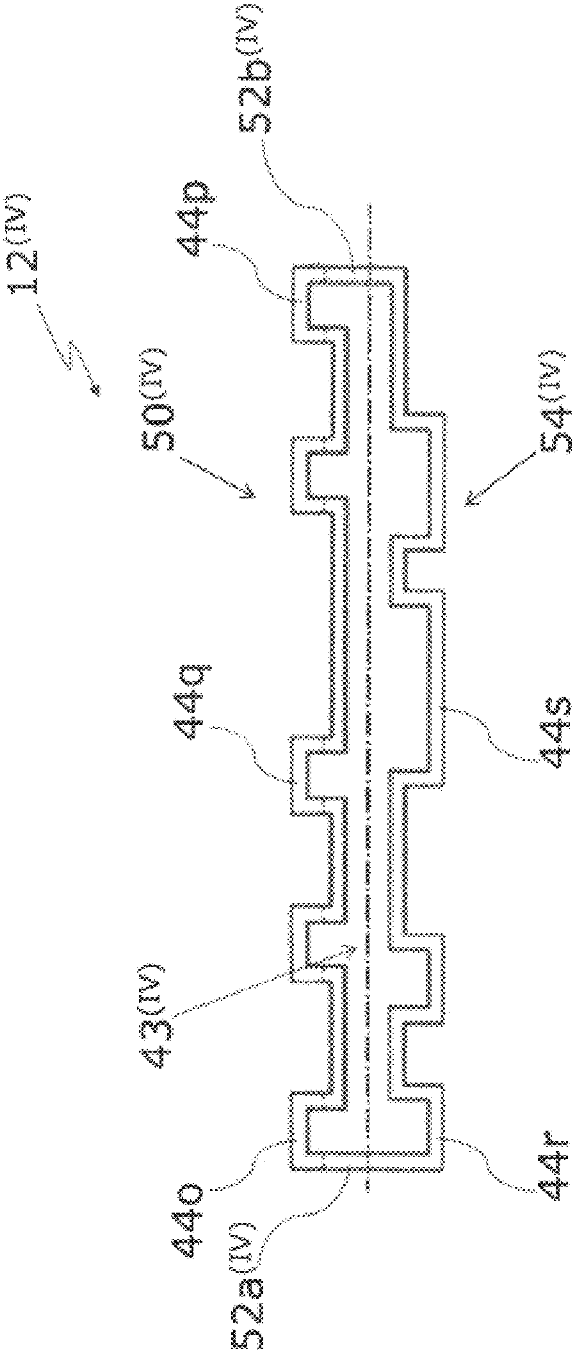
FIG. 14 is a cross section through a fifth embodiment of a side rail of the scaffold stairway.

FIG. 14 is a cross section through a fifth configuration of the rectangular side rails designed as hollow profiles 43$^{(IV)}$, by way of example the side rail 12$^{(IV)}$ here. On the side 50$^{(IV)}$, ribs 440, 44*p* are formed on the longitudinal edges 52*a*$^{(IV)}$, 52*b*$^{(IV)}$ Additional ribs are arranged between the ribs 440, 44*p* with irregular spacing, one of which is denoted by reference sign 44*q* here by way of example. On the opposite side 54$^{(IV)}$, a rib 44*r* is formed on the longitudinal edge 52*a*$^{(IV)}$. Additional ribs are formed along the side 54$^{(IV)}$, one of which is denoted by reference sign 44*s* here by way of example, and said ribs are irregularly spaced apart from one another.

Figure 15:
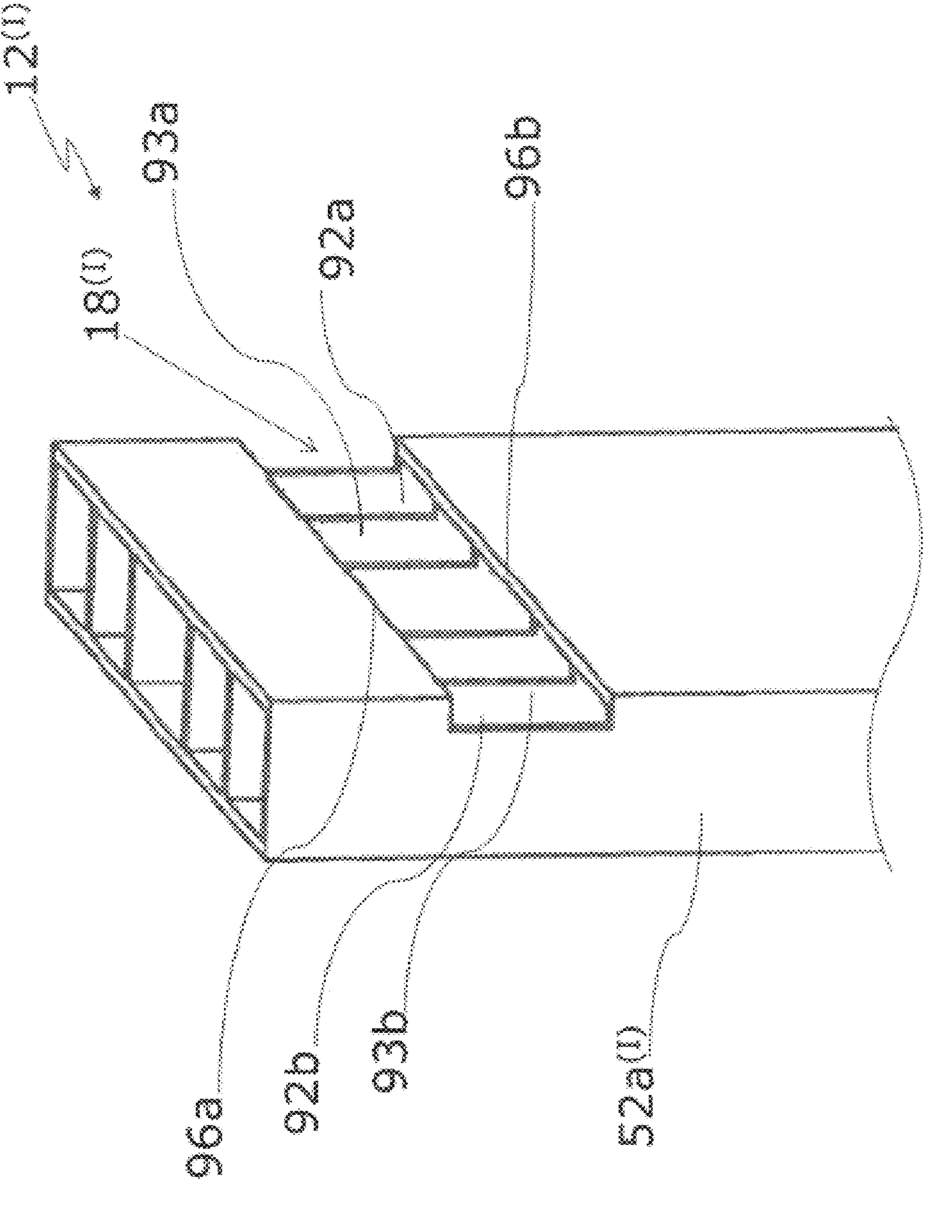
FIG. 15 is an isometric view of the second embodiment of a side rail.

FIG. 15 is an isometric view of the second configuration of the side rails, by way of example the side rail 12$^{(I)}$ here. A groove 18$^{(I)}$ comprising grooves walls 96*a*, 96*b* is formed in the side rail 12$^{(I)}$ and the side walls 93*a*, 93*b* of the hollow chambers 92*a*, 92*b*. A stairway step element 16 (see FIG. 3*a*) can be inserted into the groove 18$^{(I)}$ transversely to the side walls 93*a*, 93*b*, the longitudinal edges, with the longitudinal edge 52*a*$^{(I)}$ being shown in FIG. 15, and along the groove walls 96*a*, 96*b*.

Figure 16:
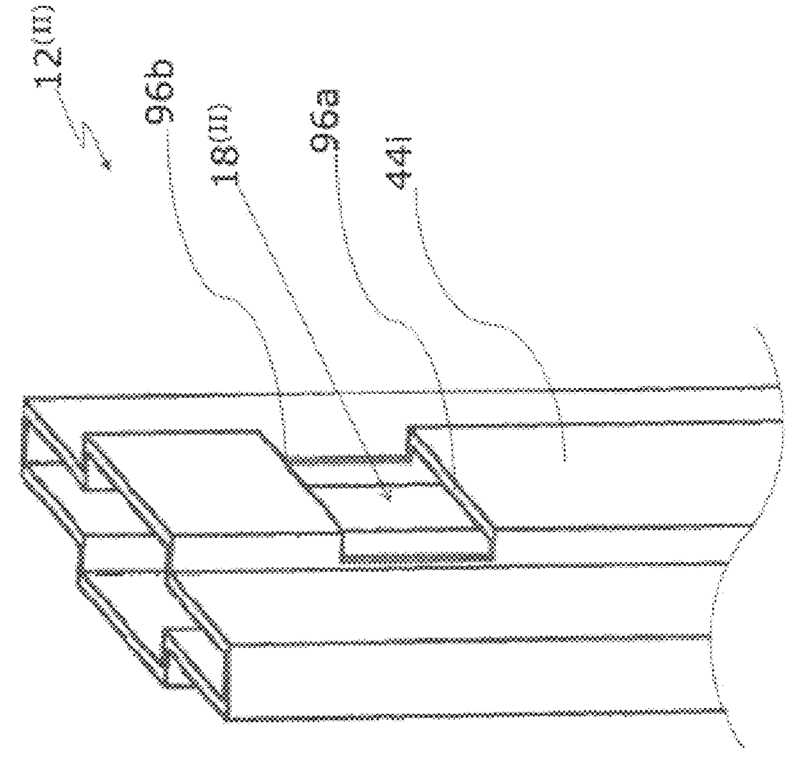
FIG. 16 is an isometric view of the third embodiment of a side rail.

FIG. 16 is an isometric view of the third configuration of the side rails, by way of example the side rail 12$^{(II)}$ here. A groove 18$^{(II)}$ comprising grooves walls 96*a*, 96*b* is formed in the rectangular fifth rib 44*i*. The depth of the groove 18$^{(II)}$ is defined by the rib height 49 (see FIG. 2).

Figure 17:
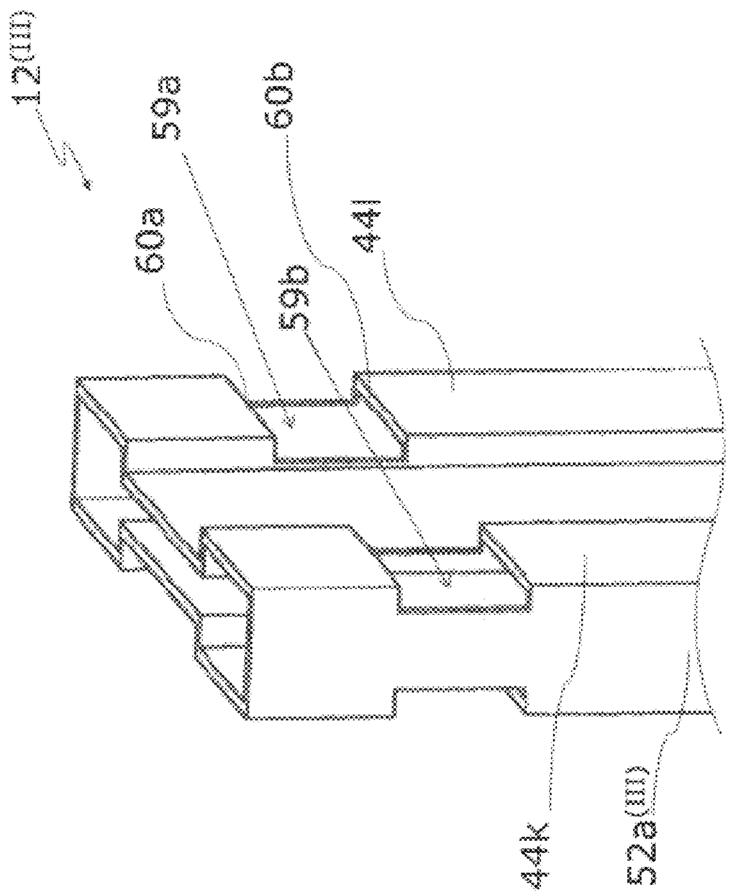
FIG. 17 is an isometric view of the fourth embodiment of a side rail.

FIG. 17 is an isometric view of the fourth configuration of the side rails, by way of example the side rail 12$^{(III)}$ here. Groove portions 59*a*, 59*b* comprising groove-wall portions 60*a*, 60*b* are formed in the ribs 44*k*, 44*l* on the longitudinal edges, with the longitudinal edge 52*a*$^{(III)}$ being shown in FIG. 17. A stairway step element 16 (see FIG. 3*a*) can be guided along the groove-wall portions 60*a*, 60*b* and inserted into the groove portions 59*a*, 59*b*. When the stairway step element 16 is inserted, the stairway step element 16 rests on the groove-wall portions 60*a*, 60*b*.

Figure 18:
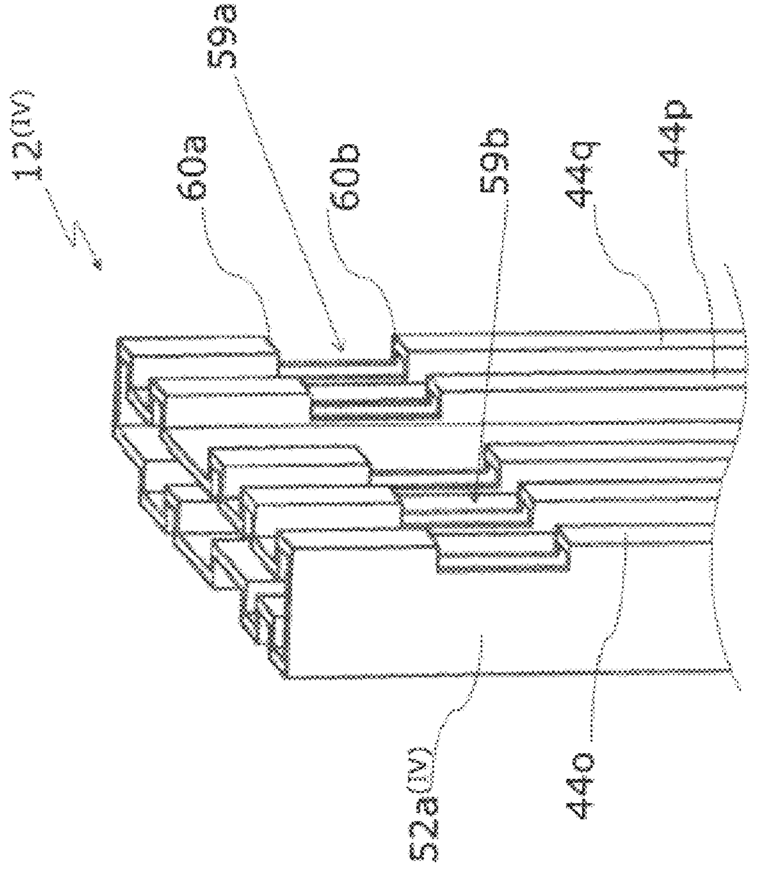
FIG. 18 is an isometric view of the fifth embodiment of a side rail.

FIG. 18 is an isometric view of the fifth configuration of the side rails, by way of example the side rail 12$^{(IV)}$ here. Groove portions 59*a*, 59*b* comprising groove-wall portions 60*a*, 60*b* are formed in the irregularly spaced ribs 440, 44*p*, 44*q* on the longitudinal edges, with the longitudinal edge 52*a*$^{(IV)}$ being shown in FIG. 18.

When considering all the figures of the drawings together, the invention relates in summary to a scaffold stairway 10 comprising two spaced-apart side rails 12, 14; 12$^{(I)}$, 14$^{(I)}$; 12$^{(II)}$, 14$^{(II)}$; 12$^{(III)}$, 14$^{(III)}$; 12$^{(IV)}$, 14$^{(IV)}$ that are designed as hollow profiles 43; 43$^{(I)}$; 43$^{(II)}$; 43$^{(III)}$; 43$^{(IV)}$ and a plurality of separate stairway step elements or stairway steps 16. The stairway steps 16 can be fastened by their free ends 17 in holding devices formed as grooves 18; 18$^{(I)}$; 18$^{(II)}$; 18$^{(III)}$; 18$^{(IV)}$ on the side faces 19 of the side rails 12, 14; 12$^{(I)}$, 14$^{(I)}$; 12$^{(II)}$, 14$^{(II)}$; 12$^{(III)}$, 14$^{(III)}$; 12$^{(IV)}$, 14$^{(IV)}$ that face one another in order to hold the stairway steps. The free ends 17 of the stairway steps 16 rest on a groove wall 96*a*, 96*b* or groove-wall portion 60*a*, 60*b*. In this way, the side rails 12, 14; 12$^{(I)}$, 14$^{(I)}$; 12$^{(I)}$, 14$^{(II)}$; 12$^{(III)}$, 14$^{(III)}$; 12$^{(IV)}$, 14$^{(IV)}$ can be coupled.

The invention claimed is:

1. A scaffold stairway, comprising:

two separate side rails, a side rail of the two separate side rails having an inner face and an outer face and a second side rail of the two separate side rails having a second inner face and a second outer face such that the inner face faces the second inner face and the outer face faces away from the second outer face, the side rail having a hollow profile defined between the inner face and the outer face, the second side rail having a hollow profile defined between the second inner face and the second outer face; and a plurality of separate stairway step elements configured to be coupled to the side rails, wherein the side rail includes a plurality of ribs on the inner face, the plurality of ribs projecting from the inner face so as to define a plurality of channels, each channel of the plurality of channels being formed between an adjacent pair of the plurality of ribs, wherein a rib height of the plurality of ribs is defined as a distance between the plurality of ribs and the plurality of channels in a direction perpendicular to surfaces of the plurality of ribs, wherein the side rail includes a plurality of second ribs on the outer face, the plurality of second ribs projecting from the outer face so as to define a plurality of second channels, each channel of the plurality of second channels being formed between an adjacent pair of the plurality of second ribs, wherein the side rail defines a plurality of grooves formed in the plurality of ribs, each of the plurality of grooves being defined by a lower horizontal edge and an upper horizontal edge, the plurality of grooves being horizontally arranged such that a lowest edge of a free end of one of the plurality of stairstep elements can rest on lower horizontal edges of the plurality of grooves and an entire height of the free end can be disposed between the lower horizontal edges and the upper horizontal edges, wherein a depth of each of the plurality of grooves ends at the plurality of channels and is equivalent to the rib height, wherein the side rail comprises first stops defined by vertical edges of the plurality of grooves and disposed at a level of the plurality of grooves, the first stops being configured to limit insertion of the free end.

2. The scaffold stairway according to claim 1, wherein the plurality of grooves are parallel to one another.

3. The scaffold stairway according to claim 1, wherein an angle formed between each groove is equal to an angle of longitudinal edges of the side rail, which angle corresponds to a gradient angle of the side rails.

4. The scaffold stairway according to claim 1, wherein distances from ends of the side rails at which the plurality of grooves are formed in the two side rails are correspondingly identical on both side rails, such that the stairway step elements can be inserted horizontally into the plurality of grooves.

5. The scaffold stairway according to claim 1, wherein the side rails comprise openings, for rivets or bolts, at the level of the plurality grooves on the outer face and the second outer face.

6. The scaffold stairway according to claim 1, wherein a groove is formed on the outer face and the second outer face and at the level of each of the plurality of grooves formed closest to ends of the side rails.

7. The scaffold stairway according to claim 1, wherein the plurality of ribs are regularly or irregularly spaced ribs, a first rib being formed on a first longitudinal edge and a second rib being formed on a second longitudinal edge.

8. The scaffold stairway according to claim 1, wherein a plurality of hollow chambers are formed in at least one side rail.

9. The scaffold stairway according to claim 1, wherein the stairway step elements comprise hook-shaped tabs, comprising openings into which bolts or rivets can be inserted.

10. The scaffold stairway according to claim 1, wherein the side rails have a gradient angle of from 30° to 55°.

11. The scaffold stairway according to claim 1, wherein the scaffold stairway is produced from light metal, comprising at least aluminum.

12. A stairway arrangement comprising a scaffold stairway according to claim 1 and a platform arranged on each end of the scaffold stairway, which can be detachably fixed.

13. The stairway arrangement according to claim 12, wherein the platform comprises two slots and/or two profile rails, into each of which a side rail of the scaffold stairway can be inserted, the slots and/or the profile rails each comprising a second stop for the side rails.

14. The stairway arrangement according to claim 13, wherein the walls of each slot and/or each profile rail comprise two tongues that are opposite one another, it being possible to insert each tongue into one of the grooves which are formed closest to the ends of the side rails on one side face in each case.

15. The stairway arrangement according to claim 13 wherein the slots and/or profile rails comprise openings, into which bolts or rivets can be inserted.

16. A side rail of a scaffold stairway made of metal, plastics material or carbon-fiber composite material according to claim 1, comprising the plurality of grooves formed on the inner face and are formed as a receptacle for stairway step elements so as to be spaced apart from one another.

17. The side rail of a scaffold stairway according to claim 16, wherein the plurality of grooves are open at at least one end.

18. A scaffold stairway, comprising:

a side rail having an inner face and an outer face;

a second side rail having a second inner face and a second outer face such that the inner face faces the second inner face and the outer face faces away from the second outer face, the side rail having a hollow profile defined between the inner face and the outer face, the second side rail having a hollow profile defined between the second inner face and the second outer face; and a plurality of stairway step elements configured to be coupled to the side rail and the second side rail, wherein the side rail and the second side rail include a plurality of ribs on the inner face and the second inner face, the plurality of ribs projecting from the inner face and the second inner face so as to define a plurality of channels, each channel of the plurality of channels being formed between an adjacent pair of the plurality of ribs, wherein a rib height of the plurality of ribs is defined as a distance between the plurality of ribs and the plurality of channels in a direction perpendicular to surfaces of the plurality of ribs, wherein the side rail and the second side rail include a plurality of second ribs on the outer face and the second outer face, the plurality of second ribs projecting from the outer face and the second outer face so as to define a plurality of second channels, each channel of the plurality of second channels being formed between an adjacent pair of the plurality of second ribs, wherein the side rail and the second side rail define a plurality of grooves formed in the plurality of ribs, each of the plurality of grooves being defined by a lower horizontal edge and an upper horizontal edge, the plurality of grooves being horizontally arranged such that a lowest edge of a free ends of one of the plurality of stairstep elements can rest on the lower horizontal edges of the plurality of grooves and an entire height of the free end can be disposed between the lower horizontal edges and the upper horizontal edges, wherein a depth of each of the plurality of grooves ends at the plurality of channels and is equivalent to the rib height, wherein the side rail and the second side rail comprise first stops defined by vertical edges of the plurality of grooves and disposed at a level of the plurality of grooves, the first stops being configured to limit insertion of the free ends.

* * * * *